May 3, 1966 P. M. WADDILL 3,249,405
CATALYTIC REFORMING APPARATUS
Filed Jan. 31, 1962
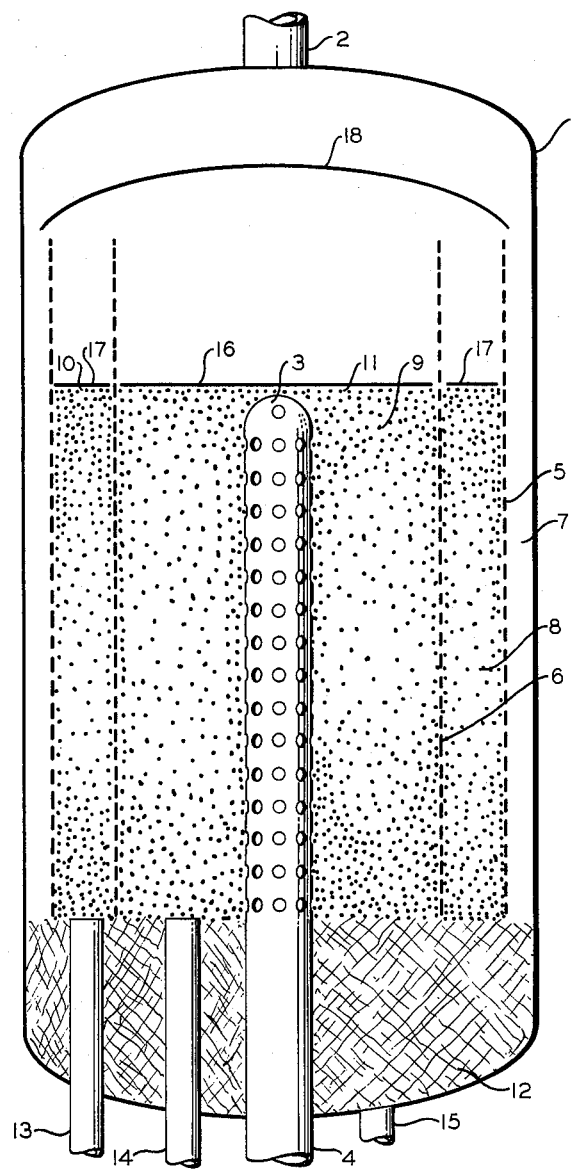
INVENTOR.
P. M. WADDILL
BY
Young & Quigg
ATTORNEYS United States Patent Office 3,249,405
Patented May 3, 1966

3,249,405
CATALYTIC REFORMING APPARATUS
Paul M. Waddill, Bartlesville, Okla., assignor to Phillips Petroleum Company, a corporation of Delaware
Filed Jan. 31, 1962, Ser. No. 170,216
4 Claims. (Cl. 23—288)

This invention relates to a reforming process and apparatus. In one aspect, the invention relates to a reforming process wherein materials poisonous to the reforming catalyst are removed from the feed prior to contact with the catalyst. In another aspect, the invention relates to a reforming vessel wherein the feedstock is contacted with a material to remove poisons prior to contact with the reforming catalyst. In another aspect, the invention relates to process and apparatus for contacting a reforming feed stream serially with two concentrically-disposed annular contact masses, the first comprising silica-alumina and the second a reforming catalyst, in the process the feed being passed radially through said masses. In a further aspect, the invention relates to a process for passing a reforming feed through a catalyst bed of low reforming activity which surrounds a catalyst bed of high reforming activity. A still further aspect of the invention is that the reforming feed gases pass generally in a radial direction through two concentrically-disposed annular contact masses, the first comprising a catalyst of low reforming activity, and the second a catalyst of high reforming activity. In a still further aspect the invention relates to a process for demetallizing a reforming feed wherein the feed is contacted by a catalyst of low reforming activity immediately prior to contacting a catalyst of high reforming activity. In still another aspect, the invention relates to reforming as described above in the presence of an added halide.

Reforming by contacting a feedstock with a fixed bed of catalytic material is known in the art. It is further known that feedstocks to be reformed often contain relatively small amounts of materials which are poisonous to the reforming catalyst, resulting in more or less frequent shutdowns to regenerate or replace the poisoned catalyst. I have now discovered an advantageous process and apparatus for reforming whereby the feed to be reformed is passed radially through two concentric annular contact masses, the first of the masses to be contacted comprising a bed of silica-alumina and the second of the masses to be contacted comprising a reforming catalyst.

Further, in lieu of the silica-alumina, other solid particulate material having a relatively low reforming activity at the conditions prevailing and a capacity to hold heavy metals are suitable. These include, among others, materials such as alumina, silica gel, bauxite and natural clays, as well as molybdena-alumina and cobalt molybdate-alumina, as long as low reforming activity of these masses under prevailing conditions is assured. Other materials capable of decomposing carbon-metal bonds in organometallic contaminants without significant occurrence of other reactions such as reforming or cracking include charcoal and activated carbon.

Accordingly, it is an object of my invention to provide process and apparatus for removing reforming catalyst poisons from a stream to be reformed. It is another object of my invention to provide advantageous arrangements of a poison-removing contact mass and a reforming catalyst. It is a further object of my invention to provide process and apparatus for extending the useful life of a reforming catalyst.

Other aspects, objects, and the several advantages of my invention are apparent from this description, the drawing, and the appended claims.

According to my invention, there are provided a process and apparatus for reforming which comprises passing a feed to be reformed radially through two annular concentric catalytic zones to a collecting zone, the first of the two catalytic zones to be contacted by the feed comprising a silica-alumina catalyst having low reforming activity at the conditions obtaining and the second of the two catalytic zones to be contacted by the feed comprising a catalyst having high reforming activity at the conditions prevailing, while maintaining the second of the two zones at reforming conditions. According to a presently-preferred embodiment of my invention, there are provided a process and apparatus for catalytically reforming a naphtha that which comprises passing the naphtha in vapor form downwardly to an annular distributing zone and thence radially inwardly through two annular concentric catalytic zones to a central vertically-discosed collecting zone and removing reformed vapor from a lower portion of the collecting zone, the outer of the two catalytic zones comprising a silica-alumina having low reforming activity at the conditions prevailing and the inner of the two catalytic zones comprising a catalyst having high reforming activity at the conditions prevailing, while maintaining the inner of the two catalytic zones at reforming conditions of temperature and pressure, and admixing a chloride with the naphtha prior to the reforming.

Referring now to the drawing for a further description of my invention, a vertically-arranged shell or vessel 1, which is preferably generally cylindrical in shape, has a nozzle 2 in an upper portion thereof. A perforated or otherwise foraminous pipe 3 terminates in a nozzle 4 outside a lower portion of the vessel. Arranged within vessel 1 are two foraminous separators 5 and 6, preferably generally cylindrical in shape and made of screen or perforated plate. These separators 5 and 6 are so arranged as to provide outer, middle, and inner annular spaces 7, 8, and 9, respectively, with relation to the vessel wall 1 and the perforated pipe 3. Space 8 is filled with a first particulate contact mass to a level indicated at 10, and space 9 is filled with a second particulate contact mass to a level indicated at 11. The lower portion of vessel 1 is filled with an inert material 12 such as sand or crushed brick. Dump nozzles 13, 14, and 15 are provided to enable removal of the contact mass in chambers 8 and 9, and the inert filler 12, respectively.

In a preferred embodiment of my invention, the flow of material being reformed is downward, i.e., nozzle 2 serves as the feed inlet while nozzle 4 serves for product withdrawal. In this instance, contact mass in space 8 comprises silica-alumina and contact mass in space 9 comprises reforming catalyst. Feed vapor flows from inlet 2 into the outer annulus 7, and thence radially inwardly through the silica-alumina 8 and the reforming catalyst 9. Reformed vapors are collected by perforated pipe 3 and withdrawn through nozzle 4 for further utility. It is also within the purview of my invention, however, to utilize up-flow, in which instance nozzle 4 serves as the inlet and nozzle 2 serves as the outlet. In this latter instance, the silica-alumina occupies chamber 9 and the reforming catalyst occupies chamber 8 so that the feed will again contact the silica-alumina for removal of catalyst poisons prior to its contact with the reforming catalyst. It is further preferred that there be provided inner and outer vapor-impervious cover plates 16 and 17, respectively. These cover plates prevent by-passing by a portion of the feed of the silica-alumina treating material in the event of down-flow operation, and by-passing by a portion of the feed of the reforming catalyst in the event of up-flow operation. Cover plates 16 and 17 should, for best efficiency, be immediately adjacent the upper catalyst surfaces 10 and 11. If it is desired to operate the apparatus of my invention without cover plates 16 and 17, for example, to facilitate recharging of spent catalyst without physical entry into the vessel, it is then preferred that the perforations in pipe 3 terminate at a point below level 11 approximately equal to the distance from pipe 3 to separator 5, i.e., the upper portion of pipe

Example 1

The following table shows arsenic content of used catalyst from a number of reforming units.

| Plant | A | | | | | B | | C | D | E | | F | G |
|---|---|---|---|---|---|---|---|---|---|---|---|---|---|
| Run No. | 1 | 2 | 3 | 5 | 6 | 7 | 8 | 9 | 10 | 11 | 12 | 13 | 14 |
| Arsenic, p.p.m.: | | | | | | | | | | | | | |
| Reactor #1 | 750 | 500 | 340 | 350 | 260 | 300 | 210 | 100 | 500 | 3,000 | 2,500 | 1,800 | 2,000 |
| Reactor #2 | | | | | | | 23 | | | 1,000 | 900 | 100 | 1,000–1,500 |
| Reactor #3 | | | | | | | 1 | | | 100 | 100 | | 10 |

3 is not perforated. This latter expedient minimizes by-passing by equalizing pressure drops through the various possible flow paths.

In fixed-bed reforming operations, the catalyst is often contained in two or more reactors connected serially. Although, in such an operation, it is only necessary to utilize my invention in the first or "lead" reactor of the series in order to remove detrimental catalyst poisons, it is often preferable and advantageous to utilize my invention in all reactors of the series, as will now be explained. First, in such serially-connected reactor trains, the reactors are sometimes rotated within the train in order to allow cyclic regeneration of the catalyst beds; in such instances, the first or "lead" reactor will contain the poison-removal bed regardless of the rotation of the beds in the line-up. Second, I have discovered that the practice of my invention has an added advantage with regard to throughput rate. For a given existing catalyst vessel modified according to the practice of my invention, the bed depth of catalyst material must be increased in order to allow an annular space for the poison-removal bed while maintaining the same weight of catalyst per vessel. If the existing annulus for catalyst is divided into two concentric annuli (one for catalyst, the second for poison-removal material), it follows that the bed depth must be doubled to maintain the same catalyst charge. In such an instance where the catalyst is, as presently preferred, contained in the inner annulus, the linear vapor velocity of the material being treated is decreased 30 percent entering the catalyst section and about 50 percent entering the center pipe. Poisons contained in the feed are thus deposited closer to the outside of the bed, which increases the holding capacity of the poison-removal material.

Although I do not wish to be limited thereto, it is my present belief that the catalyst poisons, especially with regard to the well-known platinum-type reforming catalysts, comprise unstable organometallic compounds as well as other compounds of arsenic, lead, copper, and other heavy metals. It has been found that silica-alumina pellets, such as used for TCC cracking, are advantageous as the poison-removing material.

Further, it has been found that the life of platinum-type catalyst for reforming is also decreased by loss of its chloride content, in addition to its being poisoned as discussed. I have found that catalyst life can be extended by adding chlorine to the hydrocarbon feed being reformed; the chlorine is preferably added at a rate about equal to the rate of chloride "stripping" from the catalyst. When reforming a naphtha charge, this rate is often about 1 to 2 p.p.m. but can be readily determined by analytical techniques. Thus, according to one embodiment of my invention, a metered chlorine stream is injected into the charge stock entering the reactor by way of conduit 2. The turbulence caused by passage of the charge stream and added chlorine through the poison-removal material insures intimate admixing of chlorine in the charge stock prior to contact with the catalyst, and thus the balance of chlorine in the catalyst is maintained.

The following examples will serve to more fully illustrate my invention.

Example I

The following table shows arsenic content of used catalyst from a number of reforming units.

These analyses give evidence that arsenic is deposited predominantly on the catalyst which first contacts the feed. Other heavy metals also show this trend.

Example II

At Plant A, shown above in Example I, cannisters of catalyst were placed in the catalyst bed of Reactor #1 at the beginning of Run #4 at three locations—near the inlet, near the center, and near the outlet. The cannisters were removed at the end of Run #5 after a life of 130 bbl./lb. Analysis showed arsenic in the three locations as follows: near inlet, 492 p.p.m.; near center, 504 p.p.m.; and near outlet, 7 p.p.m. In a similar manner, catalyst from No. 1 Reactor in Plant H showed the following arsenic analyses: 260 p.p.m. near inlet, 11 p.p.m. near center, and 1 p.p.m. near outlet. At the end of Run #6 in Plant A, the catalyst was analyzed for arsenic as follows: No. 1 Reactor, 267 p.p.m.; No. 2 Reactor, 30 p.p.m.; and No. 3 Reactor, 26 p.p.m. At the end of Run #7 in Plant B, arsenic analysis showed: No. 1 Reactor, 210 p.p.m.; No. 2 Reactor, 23 p.p.m.; and No. 3 Reactor, 1 p.p.m. These runs again show that arsenic is deposited predominantly on the catalyst which first contacts the feed.

Example III

The following data show that arsenic, as well as other metals, is deposited on the catalyst near quantitatively.

In Plant A, Run #3, analysis of spent catalyst from Reactor No. 1 showed 340 p.p.m. arsenic on 10,065 lb. of catalyst. This calculates to be equal to an arsenic concentration of 2.6 parts per billion (p.p.b.) in the 4,851,776 barrels of reactor charge that contacted this catalyst. A weekly laboratory analysis of the charge reported 2–5 p.p.b. arsenic.

The quantity of lead present in the charge to a run in Plant D was 12.2 pounds; analysis of the spent catalyst after the run showed 12.1 pounds lead.

The concentration of arsenic at which a catalyst can no longer be economically used is apparently greater than some value, for example, the 3000 p.p.m. shown in Plant E, Run #11 of the table of Example I, since other factors undoubtedly were also contributing to the deactivation of this run. At Plant B, a reactor charge of 2400 bbl./day naphtha containing 35 p.p.b. arsenic would introduce 0.022 lb. arsenic per day to the catalyst, a quantity sufficient to deposit 3000 p.p.m. arsenic on 7.3 pounds catalyst per day. Consequently, the cost of catalyst being deactivated by 35 p.p.b. arsenic in the feed is about 7.3×$2.75/lb. or $20/day.

It should be noted in connection with the drawing that the reactor can be arranged to dump the reforming catalyst and poison-removal material separately through nozzles 13 and 14 as shown, or they can be dumped together, for example, by way of nozzle 15 and separated by screening.

Further, in connection with the drawing, in a preferred embodiment of the invention, there is employed a baffle 18 to provide a more direct or smoother flow of incoming vapors into outer annular zone 7. One skilled in the art will understand that the extension of separators 5 and 6 above plates 16 and 17 can be of any desired length or of virtually no length depending upon the extent to which the vessel is filled and other factors readily understood by one reading this disclosure and considering the drawing.

Reasonable variation and modification are possible within the scope of this disclosure, the drawing and the appended claims to the invention, the essence of which is that there are provided reforming process and apparatus wherein a feed to be reformed is passed radially through two annular concentric catalytic zones to a collecting zone, the first of said two catalytic zones to be contacted by said feed comprising a contact mass having low reforming activity at the conditions obtaining and the second of said two catalytic zones to be contacted by said feed comprising a catalyst having high reforming activity at the conditions obtaining, while maintaining said second of said two zones at reforming conditions, and wherein stripping of the chloride content of the catalyst is counteracted by injection of chlorine into the reformer feed.

I claim:

1. Reforming apparatus comprising a vertically disposed vessel, vapor inlet means in an upper portion of said vessel, vapor outlet means comprising a substantially vertical vapor-pervious conduit entering said vessel through a lower portion thereof, inner and outer vapor-pervious substantially concentric separators disposed vertically between said vessel and said vapor outlet means so as to define respectively an inner, middle, and outer annulus, a mass of solid particulate reforming catalyst in said inner annulus, a mass of solid particulate silica-alumina in said middle annulus and a pair of vapor impervious cover plates over said middle and said inner masses, and resting on said masses.

2. Reforming apparatus comprising a vertically disposed vessel, vapor passage means in an upper portion of said vessel, second vapor passage means comprising a substantially vertical vapor-pervious conduit entering said vessel through a lower portion thereof, inner and outer vapor-pervious substantially concentric separators disposed vertically between said vessel and said second vapor passage means so as to define respectively an inner, middle, and outer annulus, a mass of solid particulate reforming catalyst in one of said inner and said middle annulus, a mass of solid contact particles in the other of said inner and said middle annulus, and cover plates above the said reforming catalyst and the said mass of solid contact particles, said cover plates being disposed below the tops of the said concentric separators.

3. Reforming apparatus comprising a vertically disposed vessel, vapor passage means in an upper portion of said vessel, second vapor passage means comprising a substantially vertical vapor-pervious conduit entering said vessel through a lower portion thereof, inner and outer vapor-pervious substantially concentric separators disposed vertically between said vessel and said second vapor passage means so as to define respectively an inner, middle and outer annulus, a mass of solid particulate reforming catalyst in one of said inner and said middle annulus filling said annulus, a mass of solid silica-alumina particles in the other of said inner and said middle annulus filling said annulus, a pair of cover plates disposed above and resting upon said masses.

4. Apparatus for purifying and reforming a naphtha feed stream containing a metallic catalyst poison, comprising a vertically disposed vessel, vapor inlet means in upper portion of said vessel, vapor outlet means comprising a vertical perforate tube in the center of and communicating with the bottom of said vessel, two concentric foraminous separators vertically disposed in said vessel defining an outer annular vapor space in communication with said vapor inlet means, a middle annular bed space for poison adsorbent, and an inner annular bed space for reforming catalyst surrounding said perforate tube, and vapor impervious cover plates over said middle and said inner beds, and resting on said beds.

References Cited by the Examiner

UNITED STATES PATENTS

| | | | |
|---|---|---|---|
| 2,363,738 | 11/1944 | Mather et al. | 208—149 |
| 2,704,741 | 3/1955 | Thayer | 208—147 |
| 2,779,714 | 1/1957 | Keith | 208—146 |
| 2,893,852 | 7/1959 | Montgomery | 208—146 |
| 2,897,131 | 7/1959 | Berger | 208—65 |
| 2,899,378 | 8/1959 | Herder | 208—65 |
| 2,905,633 | 9/1959 | Rosinski | 208—146 |
| 2,939,833 | 6/1960 | Wankat et al. | 208—251 |
| 2,969,318 | 1/1961 | Woodall | 208—138 |
| 3,051,561 | 8/1962 | Grimes | 208—146 |

DELBERT E. GANTZ, *Primary Examiner.*

ALPHONSO D. SULLIVAN, PAUL M. COUGHLAN,
*Examiners.*

H. LEVINE, *Assistant Examiner.*